(No Model.) 2 Sheets—Sheet 2.

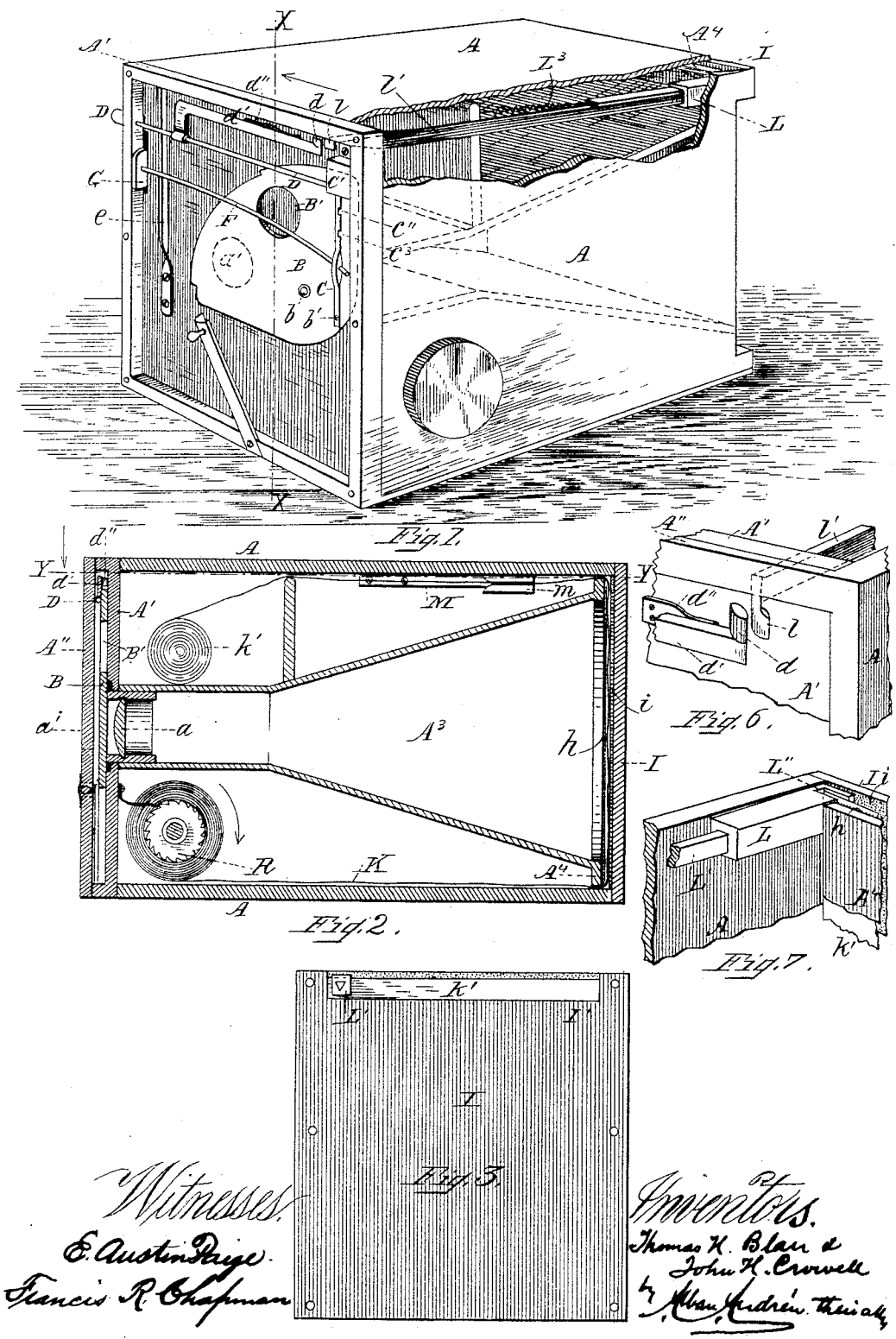

T. H. BLAIR & J. H. CROWELL.
CAMERA.

No. 450,214. Patented Apr. 14, 1891.

Witnesses:
E. Austin Paige.
Francis R. Chapman.

Inventors:
Thomas H. Blair & John H. Crowell
by Alban Andrén
their atty

UNITED STATES PATENT OFFICE.

THOMAS H. BLAIR, OF BOSTON, AND JOHN H. CROWELL, OF VINEYARD HAVEN, MASSACHUSETTS, ASSIGNORS TO THE BLAIR CAMERA COMPANY, OF MASSACHUSETTS.

CAMERA.

SPECIFICATION forming part of Letters Patent No. 450,214, dated April 14, 1891.

Application filed April 9, 1890. Serial No. 347,200. (No model.)

*To all whom it may concern:*

Be it known that we, THOMAS H. BLAIR and JOHN H. CROWELL, citizens of the United States, and residents, respectively, of Boston, Suffolk county, and State of Massachusetts, and of Vineyard Haven, in the county of Dukes and State of Massachusetts, have jointly invented new and useful Improvements in Cameras, of which the following, taken in connection with the accompanying drawings, is a specification.

This invention relates to improvements in photographic cameras of the kind in which a sensitive film or paper is used for exposure; and the invention consists of a shutter-releasing device and puncturing or marking device connected together for operation so as to automatically puncture or mark the edge of the sensitive paper or film at the time the exposure of the sensitive film or paper is made, for the purpose of enabling the operator to ascertain how far to feed such film or paper for a subsequent exposure, as will hereinafter be more fully shown and described, reference being had to the accompanying drawings, wherein—

Figure 4:
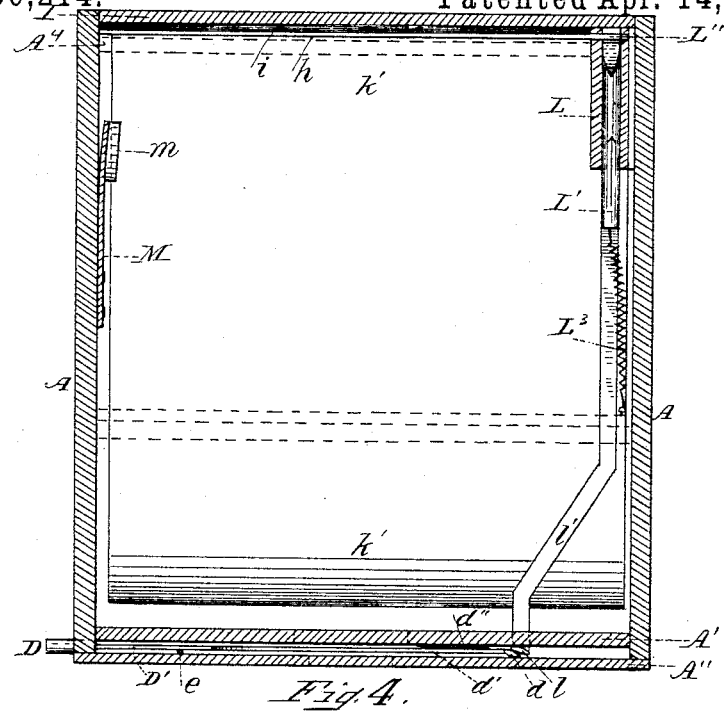
Figure 5:
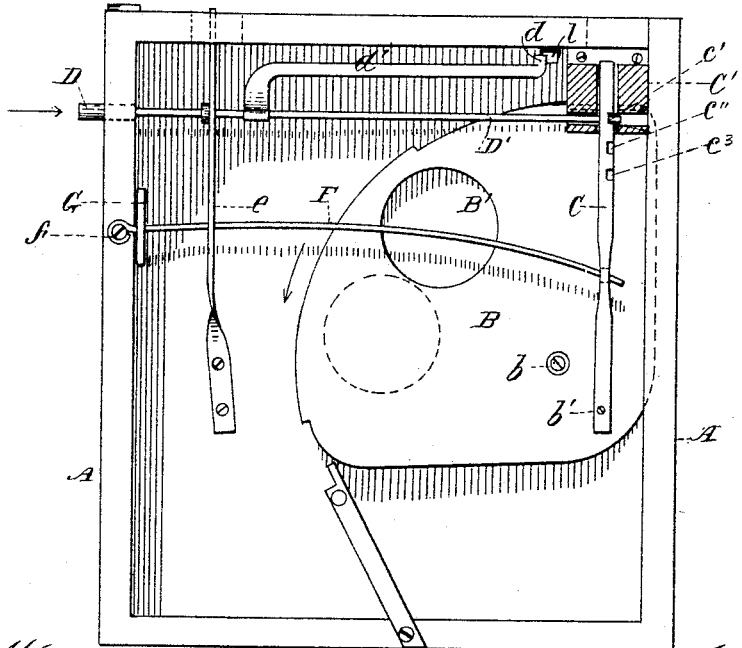

Figure 1 represents a perspective view of the improved camera, showing the front end plate removed and showing a portion of the camera-walls as broken for exhibiting the punching or marking device. Fig. 2 represents a longitudinal section on the line $x\ x$ shown in in Fig. 1. Fig. 3 represents a rear view of the camera. Fig. 4 represents a transverse section on the line $y\ y$ shown in Fig. 2. Fig. 5 represents an end view of the shutter-releasing device. Fig. 6 represents a detail perspective view of the front end of the punching or marking device, and Fig. 7 represents a detail perspective view of the rear end of the same.

Similar letters refer to similar parts wherever they occur on the different parts of the drawings.

A is the camera-box, having secured to its front end the plate A', having a perforation, within which the lens $a$ is secured, as usual.

A'' is the front end or diaphragm, having a perforation $a'$ arranged centrally in front of the lens $a$ in the ordinary manner. Between the plates A' and A'' is a space for containing the shutter and the mechanism for holding and releasing it.

We wish to state that the shutter and mechanism for actuating, locking, and releasing the same forms no part of our present invention, it being fully shown, described, and claimed in a previous application filed jointly by us March 10, 1890, Serial No. 343,276, and is only represented in the drawings for the purpose of intelligently showing the connection with it and automatic operation of the punching or marking device for the sensitive film or paper. We have shown for this purpose an oscillating shutter B, pivoted at $b$ to the plate A' and having a perforation B', adapted to pass by the diaphragm-perforation $a'$ when said shutter is released. At $b'$ is pivoted to the shutter a rod C, the upper end of which is guided in a block C', secured to the plate A'.

$c'$, $c''$, and $c^3$ are notches or locking projections on said rod C, adapted to receive the inner end of the trigger-rod D', which is normally held in a locked position relative to the said rod C by the influence of a spring $e$, as shown in Figs. 1 and 5.

D is the trigger secured to or forming a part of the spring-pressed rod D', which trigger is preferably made to project slightly outside of the camera-box, as shown in Figs. 1 and 5. The shutter is actuated by means of a suitable spring F, pivoted at $f$ to the camera side or any other stationary part of the camera, said spring having its free end connected in a suitable manner to the shutter-rod C. The said spring F is capable of being bent in two opposite directions by means of a reciprocating bar G and suitable mechanism for actuating said bar, such mechanism being, however, not represented in the drawings because it forms no part of our present invention, and is fully shown and described in our previous application above mentioned.

Within the box A is arranged the dark chamber $A^3$, having secured to its rear end the plate $A^4$, covered on its outside with cloth, felt, or equivalent textile, fibrous, or padded material $h$. I is the rear plate or cover secured to the rear end of the camera and provided on its inner face with a sheet of cloth, felt, or other padding $i$, between which and the cloth covering $h$ is held and drawn the sensitive film or paper K as it is being wound up on the roller $k$ from the roll or reel $k'$. By this arrangement it will be seen that the sensitive film or paper is prevented from being light-struck when moved between the surfaces $h$ and $i$ and their plates $A^4$ and I.

The cover I has a cut-away portion I' at one of its sides, as shown in Figs. 1 and 3, for the purpose of ascertaining at a glance the distance in which the sensitive film or paper has been moved or in which it is to be moved after one exposure has been made and previous to making another. A narrow edge K', Fig. 3, of the paper is thus wasted; but such narrow part of the film edge may be useful for the purpose of writing upon it the name, location, or other memorandum pertaining to the subject taken on the film of which such exposed strip forms a part.

In connection with the shutter-releasing mechanism we use an automatic device for marking or puncturing the exposed edge K' of the film K, and it is preferably constructed as follows: To the inside of the camera-box A, at its rear end, is secured a longitudinally-perforated block or bearing L, in which is longitudinally movable the punch-rod L'. The said bearing L has a transverse groove L'', adapted to receive one edge of the sensitive film or paper K, as shown in Figs. 4 and 7. The punch-rod L' is normally drawn inward, as shown in Fig. 4, by the influence of a suitable spring $L^3$, and held in such position at all times, except at the time when the shutter is released. The mechanism for pushing outward the punch L, for the purpose of punching or marking the edge K' of the sensitive film or paper K at the time the latter is exposed, is constructed, arranged, and operated as follows: To the trigger-rod D' is attached in a suitable manner an inclined or cam-shaped projection $d$, preferably by means of a rod, plate, or bar $d'$, as shown in Figs 1, 5, and 6, which projection comes in contact with and depresses a correspondingly-shaped inclined or cam-shaped projection $l$ on the forward end of the rod $l'$, which is secured to or made in one piece with the punch-rod L', as shown in Figs. 1, 4, and 6. It will thus be seen that as the trigger and trigger-rod D D' is pushed in the direction of the arrow shown in Fig. 5 for releasing the shutter it automatically causes the punch-rod L' to be pushed in the direction of the arrow shown in Fig. 4, and thereby causes the edge of the sensitive film or paper to be marked or punched. The punch L is automatically returned to its normal position after the projection $d$ has passed entirely beyond the projection $l$, and when the pressure on the trigger D is released the projection $d$ is caused to move backward below the projection $l$ until it reaches its normal position, as shown in Figs. 1, 4, and 6.

The plate A'' serves as a back support for the projection $d$ or its arm $d'$ during the time the trigger D is moved in the direction shown by arrow in Fig. 5, so as to prevent the projection $d$ from passing by the projection $l$ without depressing the latter and its punch-carrying bar. A spring $d''$ (shown in Fig. 6) serves to keep the bar $d'$ against the plate A'' for the purpose of preventing the projection $d$ from passing inside of the projection $l$ when the trigger is pressed.

For the purpose of guiding one edge of the sensitive film or paper with proper tension in the notch L'' of the punch-rod bearing L we secure to the inside of the opposite side of the camera-box A a spring M, provided in its free end with a grooved block or shoe $m$, which receives the edge of the film or paper and presses the opposite edge thereof with a proper tension into the said groove or notch L''.

Having thus fully described the nature, construction, and operation of our invention, we wish to secure by Letters Patent, and claim—

1. In a camera, a shutter-releasing device and a trigger for releasing the shutter, combined with a sensitive film or paper marking or punching device, having a punch or marker automatically operated in one direction by the shutter-releasing device and in the opposite direction by means of a spring, substantially as specified.

2. In a camera, a reciprocating or oscillating shutter and an adjustable spring for setting and actuating it, and a locking device for securing it in a closed position, combined with a releasing-trigger or shutter-releasing device and a sensitive film or paper marking device automatically operated by the shutter-releasing device, substantially as specified.

3. A camera having its rear end provided with a light-excluding lining of cloth or its equivalent, combined with a cover having a similar lining for the purpose of guiding the sensitive film or paper between such linings without light exposure, substantially as set forth.

4. In a camera, a shutter-releasing device and a film-marking device actuated by said releasing device, combined with the end plate or cover I, having a cut-away portion I' for exposing the marked part of the film or paper, substantially as set forth.

5. In a camera, a shutter-releasing device and a film or paper marking device actuated by the former, combined with a yielding pressed tension device for guiding and holding the sensitive paper or film in proper position relative to the marking device, substantially as and for the purpose set forth.

6. The combination, with a camera having a rear cover provided with a cut-away portion or sight-orifice, of rollers carrying a web of sensitized material which moves past the cut-away portion or orifice for ascertaining the feed of the web, substantially as described.

In testimony whereof we have signed our names to this specification, in the presence of two subscribing witnesses, on this 27th day of March, A. D. 1890.

THOMAS H. BLAIR.
JOHN H. CROWELL.

Witnesses:
ALBAN ANDRÉN,
M. J. JACKSON.